United States Patent Office

3,151,170
Patented Sept. 29, 1964

3,151,170
ETHYL AMYL KETONE PEROXIDE
Orris L. Davis, Orinda, and Robert W. Dorn, Pleasant Hill, Calif., assignors to Shell Oil Company, New York, N.Y., a corporation of Delaware
No Drawing. Filed July 20, 1961, Ser. No. 125,365
3 Claims. (Cl. 260—610)

This invention relates to a novel and useful organic peroxide product and to the method of its production. The invention relates more particularly to a novel ketone peroxide product consisting essentially of ethyl isoamyl ketone peroxide and to the method for its production.

It is well known to prepare reaction mixtures containing organic peroxides by reacting organic starting materials including aldehydes, ketones, dialkyl sulfates, acid anhydrides, etc. with hydrogen peroxide. The products obtained in processes disclosed heretofore are generally of a highly complex nature varying considerably not only in composition but in physical and chemical characteristics. Production of these compositions under conditions assuring a relatively high degree of reproducibility of composition and properties is often exceedingly difficult, if at all possible, in many of these processes. This is not too severe a handicap in some limited fields of application of these products as, for example, in their utilization as additives to motor fuels and the like. However, in the field of catalysis and chemical synthesis the utility of a specific peroxide material is usually dependent upon its purity as well as upon the ability to reproduce it with a relatively high degree of uniformity with respect to composition and characteristics. Ketone peroxides satisfying these requirements are limited to relatively few members of this class. Because of difficulties inherent in their production, only relatively few of the ketone peroxides have heretofore been produced by methods capable of being applied on a practical scale. Even these few are generally produced under conditions often unavoidably necessitating the presence during their production of an organic solvent or stabilizing medium, the presence of which often unduly restricts their utility.

It is an object of the present invention to provide a novel organic peroxide product consisting essentially of ethyl isoamyl ketone peroxide.

Another object of the invention is the provision of an improved process enabling the efficient production of an organic peroxide product consisting essentially of ethyl isoamyl ketone peroxide.

A more specific object of the invention is the provision of a novel organic peroxide composition consisting predominantly of 3,3-dihydroperoxy-5-methylheptane.

A particular object of the invention is the provision of an improved process enabling the efficient production of a ketone peroxide composition consisting predominantly of 3,3-dihydroperoxy-5-methylheptane. Other objects and advantages of the present invention will become apparent from the following detailed description thereof.

In accordance with the invention a ketone peroxide composition consisting predominantly of ethyl isoamyl ketone peroxide is produced by reacting a preformed aqueous hydrogen peroxide-sulfuric acid solution, containing from about 5 to about 15% by weight of $H_2SO_4$, with ethyl isoamyl ketone in a mol ratio of hydrogen peroxide to ethyl isoamyl ketone in excess of about 1.5.

The ethyl amyl ketone charged to the process consists essentially of a ketone wherein an ethyl group and an isoamyl group are attached to the same carbonyl carbon atom. Ketonic charge material resulting in the obtaining of a peroxide product of outstanding characteristics is that consisting essentially of 5-methyl-3-heptanone. The ethyl amyl ketone charge may be obtained from any suitable source. It need not necessarily be pure. Organic impurities such as comprised in the material as commercially available generally have no adverse effect upon the course of the reaction. The presence of any substantial amount of metal ions, or other materials adversely affecting the stability of the peroxide product, is, however, avoided. A particularly desirable feed to the process of the invention comprises the ethyl isoamyl ketone-containing reaction product obtained by reacting secondary butyl alcohol with methyl ethyl ketone in the presence of a suitable catalyst, for example, as described and claimed in U.S. Patent No. 2,697,730.

To obtain the ethyl isoamyl ketone peroxide reaction product of the present invention the ethyl isoamyl ketone charge is reacted with a preformed aqueous hydrogen peroxide-sulfuric acid solution of well defined composition. The composition of the preformed aqueous solution used as reactant to the process is critical, particularly with respect to the $H_2SO_4$ content thereof and the relative proportions of hydrogen peroxide and $H_2SO_4$ contained therein. Essential to the attainment of the objects of the invention is the maintaining of the $H_2SO_4$ content of the aqueous hydrogen peroxide-sulfuric acid solution in the range of from about 5 to about 15% by weight, and preferably in the general neighborhood of about 10% by weight of the total aqueous solution.

The mole ratio of hydrogen peroxide to $H_2SO_4$ in the preformed aqueous hydrogen peroxide-sulfuric acid solution is maintained in the range of from about 7:1 to about 35:1 and preferably from about 10:1 to about 20:1. A mole ratio of the hydrogen peroxide to sulfuric acid in the aqueous solution in the proximity of about 13:1 is particularly preferred. The preformed aqueous hydrogen peroxide-sulfuric acid solution may be prepared in a conventional manner. Thus aqueous hydrogen peroxide having a hydrogen peroxide content of, for example, from about 40 to about 50% w. may be added to precooled concentrated sulfuric acid to obtain the desired aqueous solution. Water may be added to the resulting mixture, or to the components before mixing in any amount which may be required to obtain the desired compositions.

The reaction is carried out at a temperature of from about —10 to about 20° C. and preferably at a temperature in the range of from about —5 to about 10° C. The use of a temperature in the general neighborhood of about 0° C. is particularly preferred.

The rate at which ethyl isoamyl ketone and the preformed aqueous hydrogen peroxide-sulfuric acid solution are charged to the reaction zone is controlled to result in a mole ratio of hydrogen peroxide to ethyl isoamyl ketone in the total mixture charged to the reaction zone is controlled to result in a mole ratio of hydrogen peroxide to ethyl isoamyl ketone in the total mixture charged above about 1.5. Controlling the rate at which the aqueous solution is charged so that the ratio of hydrogen peroxide to ethyl isoamyl ketone in the total feed to the process has a value of about 2 or greater is particularly preferred. In general, the mole ratio of hydrogen peroxide to ethyl amyl ketone in the total charge to the reaction need not exceed approximately 2.5. Feed rates resulting in somewhat higher ratios may, however, be resorted to within the scope of the invention.

Essential to the attainment of the objects of the invention is the maintenance of the above-defined relative concentrations of the components in the charge to the system. The reaction of the ethyl isoamyl ketone with hydrogen peroxide under the conditions herein defined, contrary to that experienced heretofore in the reaction of other alkyl ketones, such as, for example, dimethyl ketone, with hydrogen peroxide is equilibrium limited. It has been found that the maintenance of the above-defined conditions enables the reaction to proceed with the formation of the desired ethyl isoamyl peroxide in the absence of any substantial formation of higher derivatives or peroxidic by-products of cyclic structure. Since these latter compounds are often exceedingly unstable, the absence of their formation in the present process contributes largely to the efficiency of the process as well as to the obtaining of a product of substantial stability notwithstanding the absence of externally added stabilizing solvents of the type heretofore employed in other processes. Departure to any substantial degree from the above defined conditions results in the production of a product which is relatively poor in the desired ethyl isoamyl peroxide and which contains substantial amounts of the undesired higher boiling and highly unstable by-products.

Under the above-defined conditions hydrogen peroxide will react with the ethyl amyl ketone charge with the formation of a reaction product consisting predominantly of ethyl amyl ketone peroxide of the general formula

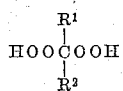

wherein $R^1$ is ethyl and $R^2$ is an amyl group. Thus, when using 3-methyl-5-heptanone as the ketonic charge to the process the ethyl isoamyl ketone peroxide product obtained will consist predominantly of the corresponding 3,3-dihydroperoxy-5-methylheptane in the absence of any substantial amount of higher boiling by-products. An ethyl isoamyl ketone peroxide product obtained from 3-methyl-5-heptanone under the conditions described herein is found to consist predominantly of 3,3-dihydroperoxy-5-methylheptanone, to have a molecular weight of 178, an active oxygen content (theory) of 18% by weight and a peroxide content (theory) of 2.25 equivalents per 100 grams.

The novel ethyl isoamyl peroxide product of the present invention finds application broadly as catalyst, additive for internal combustion motor vehicles, starting material in the production of chemical products and the like wherever the ketonic peroxides of the prior art are used. A particularly valuable field of application of the ethyl isoamyl ketone peroxide product of the present invention is, however, in the catalyzing, or curing, of polyester resins. A specific application of their use is in the curing of the liquid polyesters into rigid molded articles, as employed in the manufacturing of boats, plastic furniture, polyester surface coatings, laminated wall boards for interior decorations and the like.

A signal advantage of the invention resides in the ability to produce the desired ethyl isoamyl ketone peroxide in a high state of purity in the absence of added relatively high boiling stabilizers such as, for example, dimethyl phthalate, or the like. Unconverted ethyl amyl ketone itself functions as a suitable solvent for the peroxide product of the invention.

Although not essential to the attainment of the objects of the present invention an organic solvent may be added to the ethyl amyl ketone charge to the process. Suitable organic solvents which may be employed comprise those of relatively low volatility, that is those having a boiling temperature below that of the ethyl amyl ketone peroxide product. Such suitable solvents comprise, for example, diethyl ether.

The process of the invention may be carried out as a batch, semi-continuous, or continuous operation. The process may be carried out in any suitable conventional equipment enabling contact of the preformed aqueous solution with the ketonic charge under the above-defined conditions. In one method of carrying out the invention the preformed aqueous hydrogen peroxide-sulfuric acid solution having the above-defined composition is added to ethyl isoamyl ketone in a suitable reaction chamber, maintained at a temperature in the range of from about −10 to about 20° C. by conventional heat controlling means.

The charge to the reaction chamber and/or the contents of the reaction chamber may be cooled by conventional cooling means. The reaction mixture is preferably agitated during the course of the reaction. Reactor effluence is passed to suitable product recovery means. Thus, the reactor effluence may be stratified to effect the separation of a liquid organic phase, comprising ethyl isoamyl ketone peroxide from an aqueous liquid phase comprising $H_2SO_4$, hydrogen peroxide, and water. At least a part of the aqueous phase is recycled to the reaction mixture. The organic phase comprising the ethyl isoamyl ketone peroxide is subjected to suitable product purifying and/or separating and/or concentrating means comprising one or more such steps as, for example, vacuum distillation, solvent extraction, adsorption, or the like. In a particularly suitable embodiment of the invention the liquid organic phase separated from the reactor effluence is subjected in vacuum distillation to effect the removal of any material lighter boiling than the desired ethyl isoamyl ketone peroxide therefrom. If desired, the vacuum distillation may be conducted in the presence of water vapor. This may be accomplished by the addition of water to the contents of the column or by injection of steam. The presence of the water vapor assists in stripping the lighter boiling materials comprising, for example, water, hydrogen peroxide, and unconverted ethyl amyl ketone from the desired ethyl isoamyl ketone peroxide.

In a preferred embodiment the invention is carried out under conditions providing for substantially countercurrent flow of aqueous and organic phases through at least a substantial part of the reaction zone. In a particularly preferred embodiment, the reaction is carried out in a plurality of at least two or more reactors arranged in series flow. Substantially all of the ethyl amyl ketone charge is preferably introduced into the first reactor, and make-up preformed aqueous hydrogen peroxide-sulfuric acid charge is introduced into a terminal reactor of the series. Effluence from each reactor is subjected to stratification to effect the separation of an organic phase comprising the desired ethyl amyl ketone peroxide, from an aqueous phase comprising aqueous hydrogen peroxide and sulfuric acid. The aqueous phase so separated from the effluence from each reactor is recycled to a preceding reactor. At least a part of the aqueous phase separated from the effluence from the first reactor in the series is discarded from the system. The organic phase continues the series flow through the system. Regardless of the type of operation employed care is taken to maintain the above-defined essential reaction conditions, particularly with respect to relative ratios of charge components, during the course of the process. The organic phase separated from the effluence from the terminal reactor is removed as a final product or passed to suitable product recovery and/or concentrating and/or purification means.

*Example I*

In an operation identified herein as "Run A," ethyl isoamyl ketone peroxide (3,3-dihydroperoxy-5-methyl heptane) is produced by reacting a preformed aqueous $H_2O_2$-$H_2SO_4$ solution with ethyl isoamyl ketone (5-methyl-3-heptanone) in a reaction system consisting of two reactors arranged in series flow provided with stirrers and temperature controlling means. Each reactor is also provided with a settling chamber receiving the total effluent stream from the reactor. The ethyl isoamyl ketone is charged as a continuous stream to the first of the two reactors. An aqueous recycle stream emanating from the settling chamber receiving the effluence from the second reactor and consisting of 38% w. of $H_2O_2$, 10% w. $H_2SO_4$, the rest consisting essentially of water, is also continuously charged to the first reactor. The mole ratio of $H_2O_2$ to ethyl isoamyl ketone charged to the first reactor is 1.7:1. Effluence from the first reactor flows into the first settling chamber wherein it is stratified, thereby forming an upper organic phase comprising ethyl isoamyl ketone peroxide, unreacted hydrogen peroxide, sulfuric acid and water, and a lower aqueous phase consisting essentially of sulfuric acid, water and some unconverted hydrogen peroxide. The aqueous phase is continuously removed from the first settling chamber and eliminated from the system. The organic phase flows from the first settling chamber into the second reactor. A preformed aqueous solution consisting of 45% w. $H_2O_2$, 10% $H_2SO_4$ and the rest water, precooled to 0° C., is continuously charged to the second reactor at a rate assuring a mol ratio of hydrogen peroxide to ethyl isoamyl ketone (based on ketone charge to the first reactor) of 2:1. The 45% $H_2O_2$-10% $H_2SO_4$ solution is made by adding the required amount of 96% $H_2SO_4$ to precooled 50% $H_2O_2$.

The reactor contents are stirred and maintained at 0° C. throughout the operation. Effluence from the second reactor passes into the second settling chamber wherein it is stratified to form an upper organic phase comprising ethyl isoamyl ketone peroxide, unconverted hydrogen peroxide, a minor amount of water and traces of sulfuric acid, and a lower aqueous layer consisting essentially of aqueous sulfuric acid containing hydrogen peroxide. The lower aqueous layer formed in the second settling chamber is recycled to the first reactor as described above. The organic phase is continuously removed from the second settling chamber and washed with aqueous sodium bicarbonate to remove residual traces of $H_2SO_4$. The ethyl isoamyl ketone peroxide so obtained is a colorless liquid, having a specific gravity of 0.95, a peroxide equivalent per 100 g. of 1.45 and a water content of 4.8% w. The predominant component consists of 3,3-dihydroperoxy-5-methylheptane. The ethyl amyl ketone peroxide is obtained with a yield of 125 g. of product per 100 g. of ethyl isoamyl ketone charged.

The operation Run A is repeated in three additional operations, identified herein as Runs B, C and D, respectively, under substantially identical conditions but with the exception that in one of the operations, Run C, the reactor contents are maintained at 10° C. and in another, Run D, at 15° C. The peroxide value equivalent per 100 g. for the ethyl isoamyl ketone peroxide product of each of the operations is as follows:

| Run: | Peroxide value Equivalent/100 g. |
|---|---|
| B | 1.48 |
| C | 1.37 |
| D | 1.22 |

*Example II*

The efficiency of the ethyl amyl ketone peroxide product, prepared in Runs A, B, C and D of the foregoing Example I, as catalysts for the curing of polyester resins was evaluated as follows:

A 30 g. sample of polyester resin containing a cobalt promotor (known in the industry by the trade name Plaskon 9532) is placed into a glass beaker and brought to the temperature of 25° C. in a constant temperature bath. To this is added 0.03 g. of the ethyl amyl ketone peroxide product obtained in foregoing Example I. The mixture is stirred and the time, in minutes, recorded which it takes for gelation to occur from the moment of the peroxide addition. The end of the gel time test is that time when the resin snaps away from the stirrer when it is raised approximately two inches from the resin surface. The operation was carried out with a sample of each of the ethyl amyl ketone peroxide products obtained in the foregoing Example I. The results obtained are as follows:

| Run: | Gel time, minutes |
|---|---|
| A | 28 |
| B | 28 |
| C | 32 |
| D | 44 |

From the foregoing examples, it becomes evident that a superior product, with regard to peroxide content and gel time is obtained at the lower temperatures within the above-prescribed range.

*Example III*

The reactivity of two samples of ethyl amyl ketone peroxide, "E and F" prepared in accordance with the invention, as well as of a sample of methyl ethyl ketone peroxide, regular grade, sold commercially, sample G, are evaluated by determining the gel time in accordance with the procedure set forth in foregoing Example II. The product F is prepared substantially as described in foregoing Example I. The product E is obtained substantially under the conditions set forth in Example I but with the exception that ethyl ether was comprised in the ethyl amyl ketone charge to the process. The tests are carried out using 1% by weight of the peroxide samples (based on the resin) and repeated using 2% by weight of the peroxide sample. The tests are carried out at 25° C. The resin used is a thixotropic polyester sold in the trade under the name "Selectron 5834." In the following table, the results, that is the gel time, are given in minutes, determined by measuring the time from the addition of the peroxide until gelation of the polyester.

| Peroxide Sample | 1% Peroxide Added | 2% Peroxide Added |
|---|---|---|
| E | 18 | 14 |
| F | 23 | 15 |
| G | 24 | 17 |

*Example IV*

The stability of ethyl amyl ketone peroxide product prepared substantially as described in Example I is tested for stability by dropping a 360 g. ball from a height of 180 cm. onto a piston which fits snugly into a chamber containing 3 drops of the ethyl amyl ketone peroxide product. In ten separate tests all samples are found to be stable. Under similar conditions methyl ethyl ketone peroxide is found to be unstable.

*Example V*

The ethyl amyl ketone product obtained in Run A of foregoing Example I is concentrated by subjection to vacuum distillation at 1–5 mm. Water is added to aid in stripping residual lower boiling components including unconverted ethyl amyl ketone and hydrogen peroxide from the distillation charge. The resulting concentrated ethyl amyl ketone peroxide obtained as distillation residue is found to have a peroxide equivalent per 100 g. of 1.7.

We claim as our invention:

1. The continuous process for the production of a reaction mixture comprising ethyl isoamyl ketone peroxide in a reaction system comprising a plurality of reactors maintained at a temperature of from about −10 to about 20° C. and arranged in series flow, which comprises introducing ethyl isoamyl ketone as a continuous stream into a first reactor of said plurality of reactors, introducing a preformed aqueous hydrogen peroxide-sulfuric acid solution containing from about 5 to about 15% w. $H_2SO_4$ into a terminal reactor of said plurality of reactors, said preformed solution containing said hydrogen peroxide and $H_2SO_4$ in a mol ratio of hydrogen peroxide to sulfuric acid in the range of from about 7:1 to about 35:1 separating an aqueous phase comprising an aqueous hydrogen peroxide-sulfuric acid solution by stratification from the effluence from a terminal reactor in said plurality of reactors, recycling said aqueous phase separated from said terminal reactor effluence to a first reactor of said plurality of reactors, separating an aqueous phase comprising sulfuric acid by stratification from the effluence from a first reactor in said plurality of reactors, eliminating at least a part of said aqueous phase separated from said first reactor effluence from the system, feeding said preformed solution and said ethyl amyl ketone to the system at a rate maintaining the mole ratio of hydrogen peroxide to ethyl amyl ketone in the total feed to the system above about 1.5, and separating ethyl isoamyl ketone peroxide from the effluence from said terminal reactor after said aqueous phase has been removed therefrom.

2. The continuous process for the production of ethyl isoamyl ketone peroxide in accordance with claim 1 wherein said mol ratio of hydrogen peroxide to ethyl amyl ketone in the total feed is maintained in the range of from about 1.5 to about 2.5.

3. The continuous process for the production of ethyl isoamyl ketone peroxide in accordance with claim 1 wherein the contents of said reactors are maintained at a temperature in the range of from about −5 to about 10° C.

References Cited in the file of this patent

UNITED STATES PATENTS 3,003,000     Milas _____ Oct. 3, 1961

OTHER REFERENCES

Milas et al.: Jour. Amer. Chem. Soc., vol 81 (1959), pages 3358–61 (4 pages).

Milas et al.: Jour. Amer. Chem. Soc., vol 81 (1959), pages 3361–67 (7 pages).